Patented Sept. 18, 1951

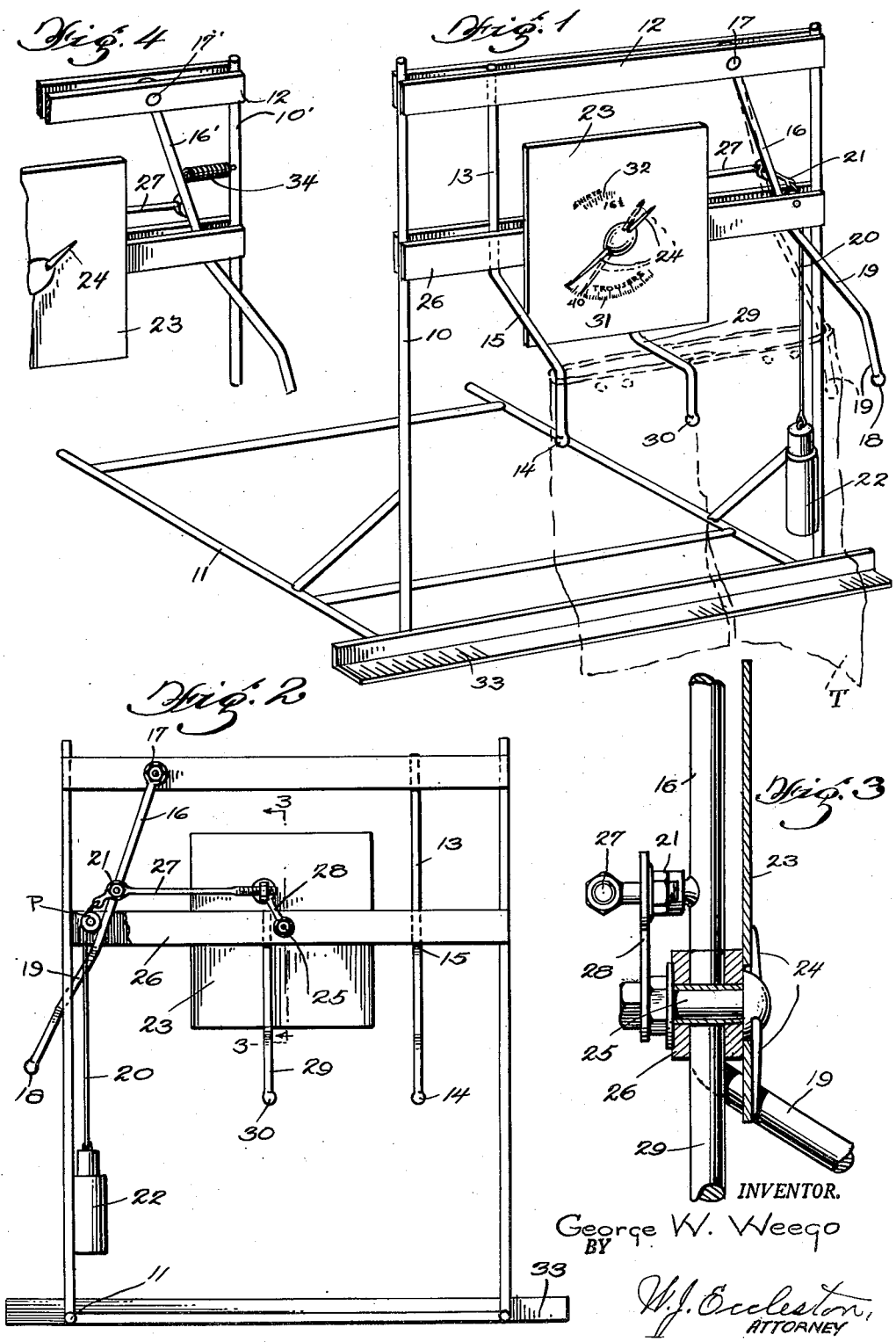

2,567,981

UNITED STATES PATENT OFFICE 2,567,981

MEASURING DEVICE

George W. Weego, Clemson, S. C.

Application February 25, 1947, Serial No. 730,674

5 Claims. (Cl. 33—2)

(Granted under the act of March 3, 1883, as amended April 30, 1928; 370 O. G. 757)

The invention described herein, if patented, may be manufactured and used by or for the Government for governmental purposes, without the payment to me of any royalty thereon.

My invention deals with a measuring device, and more particularly with a machine adapted to measure the width of garments or the like, such as the collar of a shirt, the waist of a skirt or trousers, and operating on the principles of an inside caliper.

In the sorting of second-hand clothing, it is important to determine quickly the size of each individual garment. While no difficulty is encountered in measuring the length of a shirt sleeve or trouser leg, measurements of widths of shirt collars and trouser or skirt waistbands are frequently a source of delay and error. Moreover, an error in measuring the width of a garment is more serious than an error in measuring its length, as the latter can be easily adjusted, while a misfit in a shirt collar or trouser waist necessitates elaborate tailoring work. In military installations, such as Army Quartermaster salvage depots, great quantities of repairable clothing must be sorted according to size in a minimum of time and maximum of accuracy because the usefulness of the repaired and reissued clothing is negatived if it is missized at the depot. A similar problem is encountered in the second-hand clothing trade, in which large quantities of cast-off clothing are repaired, cleaned and sized prior to being offered to the public through customary retail channels.

It is thus a primary object of my invention to provide a machine capable of automatically indicating the width of a garment, such as a trouser waist, shirt collar, or the like.

Another principal object of my invention is a garment size-indicating machine operating on the principle of an inside caliper and having means to adjust itself automatically to the width of a garment measured thereon.

A further object of my invention is a garment-measuring machine which is simply and sturdily constructed of inexpensive material, and which has a minimum of movable parts, thereby reducing the possibility of mechanical failure and need for repair.

Another object of my invention is the speeding up of garment sizing, and the elimination of errors due to the human element inherent in conventional garment-sizing operations.

Still another object of my invention is a portable garment-measuring machine, easy to install and simple to operate.

These and other objects of my invention will more fully appear in the following description of my measuring device, which essentially consists of a frame, one or more fingers fixedly mounted on the frame, another finger pivoted on the frame and tending to move away from the fixed finger or fingers, and a scale with a pointer responsive to a change of distance between the fixed and movable fingers when the movement of the pivoted finger is arrested by garment fitted over the fixed and movable fingers.

A preferred embodiment of my invention and one modification thereof are illustrated in the appended drawings, wherein Fig. 1 is a perspective view of my measuring device;

Fig. 2 is a rear elevation corresponding to Fig. 1;

Fig. 3 is a section through Fig. 2 along lines 3—3; and

Fig. 4 illustrates perspectively, in a broken-away view, a modification of the finger-actuating means of the means illustrated in Fig. 1.

More particularly, reference numeral 10 in the drawings denotes a rectangular vertical frame, preferably mounted on a base 11. The upper horizontal beam 12 of the frame carries a fixed finger 13 having a downwardly extending blunt free end 14. The finger is preferably offset at 15 to extend its free end 14 into a plane spaced from that of frame 10. A movable finger 16 is pivotedly mounted on beam 12 at 17; its downwardly extending blunt free end 18 is likewise offset at 19. A cord or similar flexible means 20 has one of its ends attached to movable pivoted finger 16 at point 21 intermediate pivot point 17 and free end 18 of the finger. A weight 22 is attached to the free end of the cord and transmits gravity pull to finger 16 by means of cord 20 which runs over a pulley P associated with frame 10 at a point laterally of point 21 and away from fixed finger 13. Pivoted finger 16 is thus positively urged to move away from fixed finger 13. A scale 23 is mounted on frame 10 in vertical position, and a pointer 24 is pivotally mounted on shaft 25 on a horizontal bar 26 which is part of frame 10. A linkage consisting of two pivotedly connected arms 27, 28 is interposed between movable finger 16 and pointer 24 to actuate the pointer so as to indicate on scale 23 the position of finger 16.

Preferably, a second fixed finger 29 fixedly depends from horizontal bar 26, with a blunt free end 30 offset in the same plane as the blunt free ends of fingers 13 and 16. This second fixed finger 29 is laterally spaced from fixed finger 13 and located intermediate fingers 13 and 16.

To operate the device, the garment to be measured, such as trousers T, is buttoned to provide a circular opening, e. g., trouser waistband, which is then fitted over the free end of a fixed finger, such as free end 14 of fixed finger 13, and over the free end 18 of pivoted finger 16. The tendency of finger 16 to move away from fixed finger 13 causes the waistband of trousers T to be stretched taut. At that point, movement of finger 16 is arrested, and the distance between the free ends 14 and 18 is indicated by a corresponding movement of pointer 24 on scale 23. Graduations 31 on scale 23 indicate double the distance between points 14 and 18, so as to correspond to the measurement of the waistband of trousers T in inches. For instance, a 40-inch waistband of trousers T permits free end 18 of movable finger 16 to travel 20 inches away from free end 14 of fixed finger 13; consequently, if a marking "40" is placed on scale 23 at the point indicated by pointer 24 when points 14 and 18 are 20 inches apart, a size 40 pair of trousers will instantly be recognized as such by reading the scale.

To obtain an accurate reading, the offset ends of fingers 13 and 16 are inserted into the garment at the circular waist opening of the trousers and permitted to move away relative to each other until the trousers hang free and clear of frame 10. In order to avoid excessive stretching of the garment, weight 22 should not be too heavy; a weight in the order of 7 pounds gives satisfactory results.

To measure shirt collars, a set of graduations 32 is placed on scale 23 in juxtaposition to graduation 31 and calibrated so as to indicate the distance between the free end of 18 of movable finger 16 and the free end 30 of the second fixed finger 29 on a scale of 2:1. Thus, a reading of "16½" on graduation 32 indicates a distance of 8¼ inches between points 30 and 18. Obviously, a shirt with a collar size of 16½, i. e., having a neckband of 16½ inches, buttoned and fitted over fingers 16 and 30 will permit the free ends of the fingers to separate for a distance of 8¼ inches, corresponding to a reading of 16½ on graduations 32.

To facilitate the length measurement of trouser legs, sleeves, etc., I have provided a rule 33, graduated in inches and fractions of inches, at the lower portion of frame 10.

Other means may, of course, be substituted for the weight 22 to impart positive movement to movable finger 16 in the desired direction. An example of such a modification is illustrated in Fig. 4, showing a coil spring 34 attached at one end to a vertical element of frame 10' and at the other end to pivoted finger 16' below pivot point 17'.

My machine enables an unskilled worker to measure the size of garments at an average rate of about 240 garments per hour, which is about twice the rate attainable by conventional garment measuring with yardstick and measuring tape. Errors are minimized because of the automatic operation of the machine. The use of my machine of course is not limited to sizing salvaged or other second hand clothing; examples of other applications are sampling and testing of new clothes, and, in fact, the taking of inside measurements of flexible and other articles of every kind.

Obviously, modifications and variations of dimensions and arrangement of parts of my machine, as well as substitution, addition or omission of parts of the preferred example illustrated and described by me herein, may be made without departing from its principle of operation or from the spirit of my invention. I desire, therefore, to limit the range of my patent protection only by the appended claims.

I claim:

1. A machine for measuring the width of garments such as the collar width of a shirt and the waistband width of trousers, comprising an upright frame, a fixed finger supported by and downwardly extending from the top portion of said frame, a first movable finger supported by and downwardly extending from the top portion of said frame, a second fixed finger supported by and downwardly extending from the top portion of said frame, each of said fingers having a lower free end insertable into said garments, means for positively urging said movable finger away from said fixed fingers to distend said garments linearly when suspended by the free ends of said fingers, and indicator means actuated by said movable finger for indicating the distance between the free ends of said movable finger and of either fixed finger at the point of maximum distension of the thus suspended garments, said indicator means comprising a single pivoted pointer, means for linking said pointer with said movable finger, a first scale cooperating with said pointer, said first scale being graduated in shirt collar width units, said shirt collar width units on said scale corresponding to twice the actual distance between the free ends of said second fixed finger and said movable finger when a shirt collar is linearly distended therebetween, and a second scale cooperating with said pointer, said second scale being graduated in trouser width units, said trouser width units corresponding to twice the distance between the free ends of said first fixed finger and said movable finger when a trouser waistband is linearly distended therebetween.

2. A machine for measuring the width of garments such as the collar width of a shirt and the waistband width of trousers, comprising an upright frame, a fixed finger supported by and downwardly extending from the top portion of said frame, a second finger fixed to and downwardly extending from the top portion of said frame, and a movable finger downwardly extending from the top portion of said frame, said movable finger being pivoted to the top portion of said frame at a point laterally outwardly spaced from said first fixed finger and from the point of said second fixed finger, each of said fingers having a lower free end for freely suspending a shirt by its collar from the said second fixed finger and said movable finger and trousers by their waistband from the said first fixed finger and said movable finger, means for positively urging said movable finger away from said fixed fingers to distend said garments linearly when suspended by the free ends of said fingers, and indicator means actuated by said movable finger for indicating the distance between the free ends of said fixed fingers and of the movable finger at the point of maximum distension of the thus suspended garments, said indicator means comprising a pivoted pointer, means for linking said pointer with said movable finger, a first scale cooperating with said pointer, said first scale being graduated in shirt collar width units, said shirt collar width units on said scale corresponding to twice the actual distance between the free ends of said second fixed finger and said movable finger when a shirt collar is linearly distended therebetween, and a second scale cooperating with said pointer, and said second scale being graduated in trouser width units, said trouser width units corresponding to twice the distance between the free ends of said first fixed finger and said movable finger when a trouser waistband is linearly distended therebetween.

3. A machine for measuring the width of garments such as the collar width of a shirt and the waistband width of trousers, comprising an upright frame, a fixed finger supported by and downwardly extending from the top portion of said frame, a second fixed finger supported by and downwardly extending from the top portion of said frame, a movable finger supported by and downwardly extending from the top portion of said frame, each of said fingers having a lower free end offset so as to be in a plane spaced from the vertical plane of said frame and insertable into said garments, means for positively urging said movable finger away from said fixed fingers to distend said garments linearly when suspended by the free ends of said fingers, and indicator means actuated by said movable finger for indicating the distance between the free ends of said fixed fingers and of the movable finger at the point of maximum distension of the thus suspended garments, said indicator means comprising a single pivoted pointer, means for linking said pointer with said movable finger, a first scale cooperating with said pointer, said first scale being graduated in shirt collar width units, said shirt collar width units on said scale corresponding to twice the actual distance between the free ends of said second fixed finger and said movable finger when a shirt collar is linearly distended therebetween, and a second scale cooperating with said pointer, said second scale being graduated in trouser width units, said trouser width units corresponding to twice the distance between the free ends of said first fixed finger and said movable finger when a trouser waistband is linearly distended therebetween; whereby when said garments are freely suspended clear of said frame, the width of said garments is automatically and instantly measured with accuracy.

4. A machine for measuring the width of garments such as the collar width of a shirt and the waistband width of trousers, comprising an upright frame, a fixed finger supported by and downwardly extending from the top portion of said frame, a second finger fixed to and downwardly extending from the top portion of said frame, and a movable finger pivoted to and downwardly extending from the top portion of said frame, said movable finger being pivoted to the top portion of said frame at a point laterally outwardly spaced from said first fixed finger and from the fixed point of said second fixed finger, each of said fingers having a lower free end for freely suspending a shirt by its collar from the said second fixed finger and said movable finger and trousers by their waistband from the said first fixed finger and said movable finger, means for positively urging said movable finger away from said fixed fingers to distend said garments linearly when suspended by the free ends of said fingers, and indicator means actuated by said movable finger for indicating the distance between the free ends of said fixed fingers and of the movable finger at the point of maximum distension of the thus suspended garments, said indicator means comprising a single pointer having two free ends and pivoted at a point intermediate said ends, means for linking said pointer with said movable finger, a first scale cooperating with one end of said pointer, said first scale being graduated in shirt collar width units, said shirt collar width units on said scale corresponding to twice the actual distance between the free end of said second fixed finger and said movable finger when a shirt is linearly distended therebetween by its collar, and a second scale cooperating with the other end of said pointer, said second scale being graduated in trouser width units, said trouser width units corresponding to twice the distance between the free ends of said first fixed finger and said movable finger when a trouser waistband is linearly distended therebetween.

5. A machine for measuring the width of garments such as the collar width of a shirt and the waistband width of trousers, comprising an upright frame, a fixed finger supported by and downwardly extending from the top portion of said frame, a second finger fixed to and downwardly extending from the top portion of said frame, and a movable finger pivoted to and downwardly extending from the top portion of said frame, said movable finger being pivoted to the top portion of said frame at a point laterally outwardly spaced from said first fixed finger and from the fixed point of said second fixed finger, each of said fingers having a lower free end offset so as to be in a plane spaced from the vertical plane of said frame and insertable into said garments, means for positively urging said finger away from said fixed fingers to distend said garments linearly when suspended by the free ends of said fingers, and indicator means actuated by said movable finger for indicating the distance between the free ends of said fixed fingers and of the movable finger at the point of maximum distension of the thus suspended garments, said indicator means comprising a pointer having two free ends and pivoted at a point intermediate said ends, means for linking said pointer with said movable finger, a first scale cooperating with one end of said pointer, said first scale being graduated in shirt collar width units, said shirt collar width units on said scale corresponding to twice the actual distance between the free ends of said second fixed finger and said movable finger when a shirt is linearly distended therebetween by its collar, and a second scale cooperating with the other end of said pointer, said second scale being graduated in trouser width units, said trouser width units corresponding to twice the distance between the free ends of said first fixed finger and said movable finger when a trouser waistband is linearly distended therebetween, whereby when said garments are freely suspended clear of said frame, the width of said garments is automatically and instantly measured with accuracy.

GEORGE W. WEEGO.

REFERENCES CITED

The following references are of record in the file of this patent:

UNITED STATES PATENTS

| Number | Name | Date |
|---|---|---|
| 1,325,943 | Howard | Dec. 23, 1919 |
| 1,950,912 | Aronson | Mar. 13, 1934 |
| 2,187,914 | Reitan | Jan. 23, 1940 |
| 2,274,275 | Phillips | Feb. 24, 1942 |
| 2,326,820 | Bliss | Aug. 17, 1943 |
| 2,432,160 | Johnson | Dec. 9, 1947 |